United States Patent
Butsch et al.

[11] Patent Number: 6,131,479
[45] Date of Patent: Oct. 17, 2000

[54] DEVICE FOR CONVERTING ROTARY MOTION INTO AXIAL MOTION

[75] Inventors: Michael Butsch, Diasendorf; Roman Stauch, Igersheim, both of Germany

[73] Assignee: Dewitta Spezialmaschinenfabrik Wittenstein GmbH & Co. KG, Igersheim, Germany

[21] Appl. No.: 09/199,758

[22] Filed: Nov. 25, 1998

Related U.S. Application Data

[63] Continuation-in-part of application No. 08/809,155, Mar. 6, 1997, abandoned, which is a continuation-in-part of application No. PCT/DE96/01187, Jun. 27, 1996.

[30] Foreign Application Priority Data

Jul. 7, 1995 [DE] Germany .......................... 195 24 772

[51] Int. Cl.$^7$ ...................................................... F16H 55/17
[52] U.S. Cl. ........................ 74/459; 74/89.15; 74/424.8 R
[58] Field of Search ........................ 74/424.8 C, 484.8 R, 74/459, 424.6, 89.15; 475/263, 346

[56] References Cited

U.S. PATENT DOCUMENTS

| 4,375,770 | 3/1983 | Druet | 74/424.8 A |
| 4,576,057 | 3/1986 | Saari | 74/424.8 C |
| 4,926,708 | 5/1990 | Dietrich et al. | 74/424.8 C |
| 5,121,019 | 6/1992 | Pradler. | |

FOREIGN PATENT DOCUMENTS

| 95 08 860 | 3/1995 | European Pat. Off. . | |
| 2 518 208 | 6/1983 | France . | |
| 1 212 381 | 7/1963 | Germany . | |
| 2 601 493 | 7/1976 | Germany . | |
| 87 02 656 | 8/1987 | Germany . | |
| 981-742-A | 5/1981 | Russian Federation | 74/424.8 C |

*Primary Examiner*—David Fenstermacher
*Attorney, Agent, or Firm*—Collard & Roe, P.C.

[57] ABSTRACT

A device for converting rotary motion into axial motion, having planetary rollers which are driven from a stationary drive housing by a drive shaft. These planetary rollers are held circumferentially at the same distance apart by a rotatable cage. The planetary rollers engage a thrust element via drive grooves on both the planetary rollers and the thrust element. The drive grooves on the planetary rollers do not engage the drive grooves on the drive shaft which frees the planetary rollers from harmful double engagement. The drive shaft drives these rollers via a gear tooth region on the rollers so as to function reliably and durably with a compact construction. The thrust element which is hollow, is therefore, able to move with a free thrust, i.e. without an additional guide element guiding it along a thrust path. Finally the thrust element has a high bucking strength so that it can withstand relatively large axial pressure.

5 Claims, 3 Drawing Sheets

DEVICE FOR CONVERTING ROTARY MOTION INTO AXIAL MOTION

This application is a continuation-in-part of U.S. application Ser. No. 08/809,155 filed on Mar. 6, 1997 now abandoned which is a international application PCT/DE 96/01187, filed Jun. 27, 1996.

BACKGROUND OF THE INVENTION

1. Field of the Invention

The invention relates to a device for converting rotary motion into axial motion wherein an electric motor rotates a plurality of rollers to drive a thrust element in an axial direction.

2. Description of the Prior Art

A device for converting rotary motion into axial motion is known in the prior art. For example German Utility Model 8702 656.2 discloses a device for converting rotary motion into axial motion.

In addition, U.S. Pat. No. 5,121,019 to Pradler, now expired, discloses a linear drive unit comprising an electric motor, a three-stage planetary step down gear means, a conversion drive, and a driven rod disposed within a housing. In particular, the conversion drive in Pradler suffers from the disadvantage in that the design of FIG. 3a shows a double engagement for revolving members 166. This is because threads 172 on revolving members 166 simultaneously engage thread 160 of central part 150 and thread 164 of driven rod 64. Furthermore, this engagement occurs along the same axial position in rolling members 166 leaving little tolerance for threads 172 to move while engaging drive body 92 and driven rod 64.

The present invention is designed as an improvement over the prior art because this invention is designed to avoid the double engagement of the drive grooves on the planetary rollers between the drive shaft and the axially driven thrust element.

SUMMARY OF THE INVENTION

The invention relates to a device for converting rotary motion into axial motion. In this case, the drive shaft can be driven by a drive unit such as a stationary electric motor. When the drive shaft rotates, it rotates the planetary rollers to then drive a thrust element axially. The thrust element is essentially a hollow tube that has an internal thread. The parameters of the moving parts determine the ratio between the rotational speed of the drive shaft, and the axial travel of the thrust element. These parameters may be summarized as follows:

$$S_{ax} = U_a * \left( Ps \frac{1}{d_{ws} * d_{gr}} - Pr * \frac{d_{gs}}{d_{gr} * d_{gr}} \right) * \frac{d_{wa} * d_{gr}}{d_{gr} + d_{wr}}$$

In this equation, $S_{ax}$=axial travel of the thrust element
$U_a$=number of revolutions in the drive shaft
$Ps$=pitch of the grooves of the thrust element
$Pr$=pitch of the grooves of the planetary rollers
$d_{gs}$=diameter of the grooves of the thrust element
$d_{gr}$=diameter of the grooves of the planetary rollers
$d_{ws}$=rolling circle diameter of the toothing of the drive shaft pinion.
$d_{wr}$=rolling circle diameter of the toothing of the planetary rollers.

The drive shaft extends along a central axis and attaches to a pinion at one end. This drive shaft rotates around the central axis and in turn, rotates the pinion. A series of four planetary rollers contact the pinion at one end and rotate around the pinion. On this end, the planetary rollers have a gear tooth region for engaging this pinion. Apart from this gear tooth region, these planetary rollers each have threads or grooves that engage at least one internal groove or thread on the thrust element so as to drive the thrust element axially. These internal grooves may be in the form of a multi-turn thread. However, when these planetary rollers drive the thrust element axially, they also undergo axial tension in the opposite direction. Therefore, it is important in this design to absorb the axial forces of the planetary rollers as they are driving the thrust element while still allowing for high tolerance within the system. This is to avoid impingement wear or locking up of the drive system, which would thus render the system inoperable.

In a first embodiment of the invention, the drive shaft can be used to absorb the axial forces of the planetary rollers. Therefore, the drive shaft can be mounted in an axially fixed manner on the drive housing. In addition, to transmit the axial forces from the planetary rollers to the drive shaft, the drive shaft has bearing grooves or profiles that mate with corresponding bearing grooves on the planetary rollers. The bearing grooves on the planetary rollers engage in the corresponding bearing grooves or profiles of the drive shaft to fix the rollers axially. In addition, this design frees the drive grooves from double engagement between the thrust element and the drive shaft because the planetary rollers only contact the drive shaft in the region of the bearing grooves on the drive shaft and the bearing grooves on the planetary rollers, and not in the region of the drive grooves.

If the bearing grooves are arranged on the device shaft, the values of the mean diameters of the grooves of the bearing element match the pitch circle of the gear teeth between the drive pinion of the drive shaft and the planetary rollers. This requirement generally applies to designs in which drive grooves of the planetary rollers engage in mating grooves of the drive shaft which is directly meshed with the planetary rollers by gear teeth.

The mating grooves or profiles of the planetary roller need not be a component of the drive shaft. These planetary rollers need only to be fixed axially in a rotatable manner in relation to the drive housing.

In a second embodiment of the invention, the mating grooves or profiles that match the grooves or profiles of the planetary rollers are not a component of the drive shaft. Here, the device has a bearing element that is mounted on the drive shaft so that it is axially fixed, but rotatable about the central axis. In this case, the drive grooves of the planetary rollers and the bearing grooves of the bearing element are designed to have substantially zero pitch.

The invention has the advantage in that a tubular thrust element can be driven out over a distance where there is no need for a guide element. As a result, the thrust element has a high buckling strength. In addition, the drive elements inside the tube can be encapsulated by means of a closure at the tube end. The thrust element can then be sealed off in a simple manner in the housing of the drive shaft. Finally, both designs allow the present invention to be free from impingement, wear or locking up so that this design can be truly operable.

Therefore, it is an object of the invention to provide a rotary motion to axial motion device which keeps the drive grooves on the planetary rollers from double engagement.

Another object of the invention is to create a device for turning axial motion into rotary motion with limited impingement.

A further object of the invention is to create a device for converting axial motion into rotary motion that is simple in design, inexpensive to manufacture, and reliable in operation.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1:
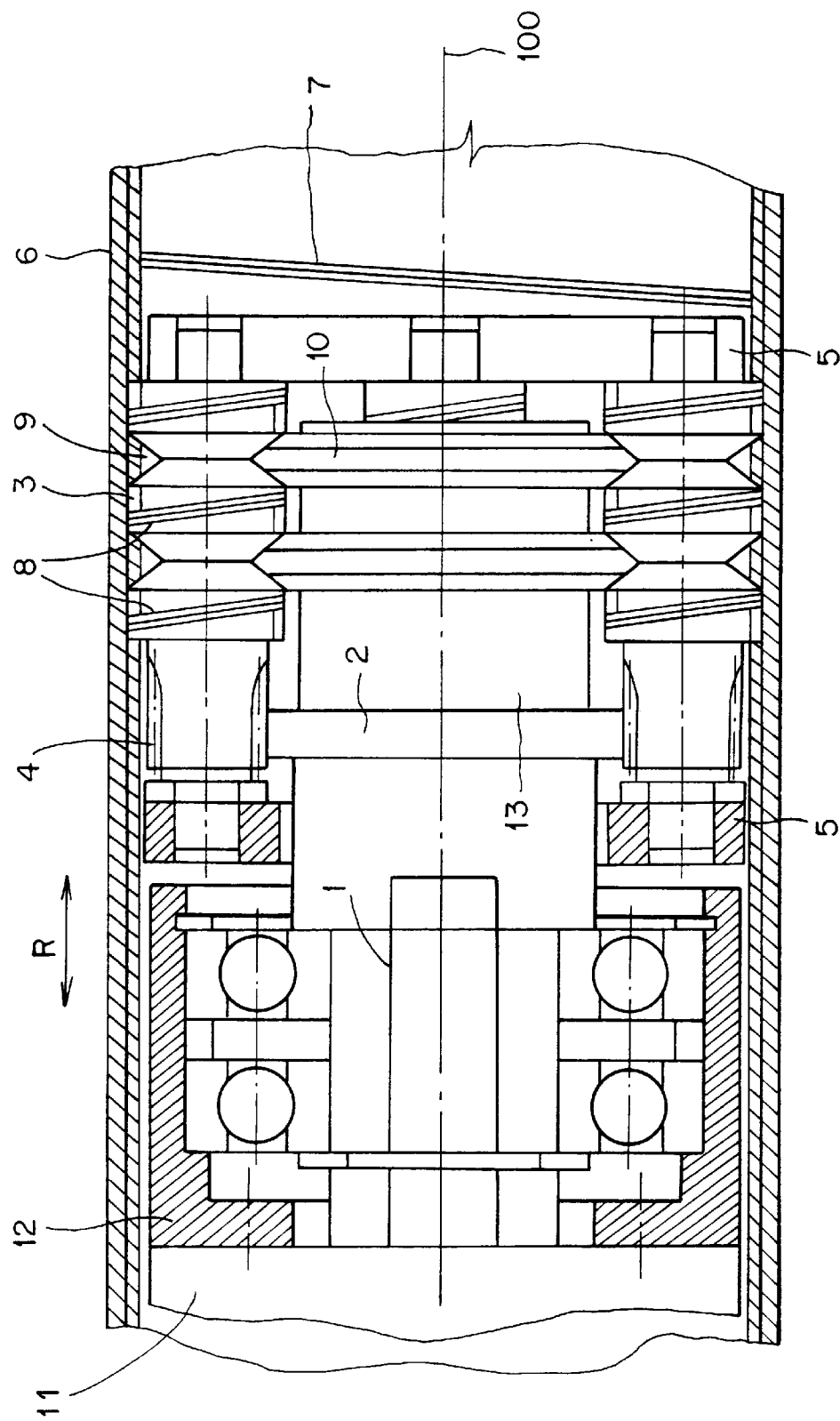
FIG. 1 is a longitudinal cross-sectional view of the first embodiment of the invention.
Figure 2:
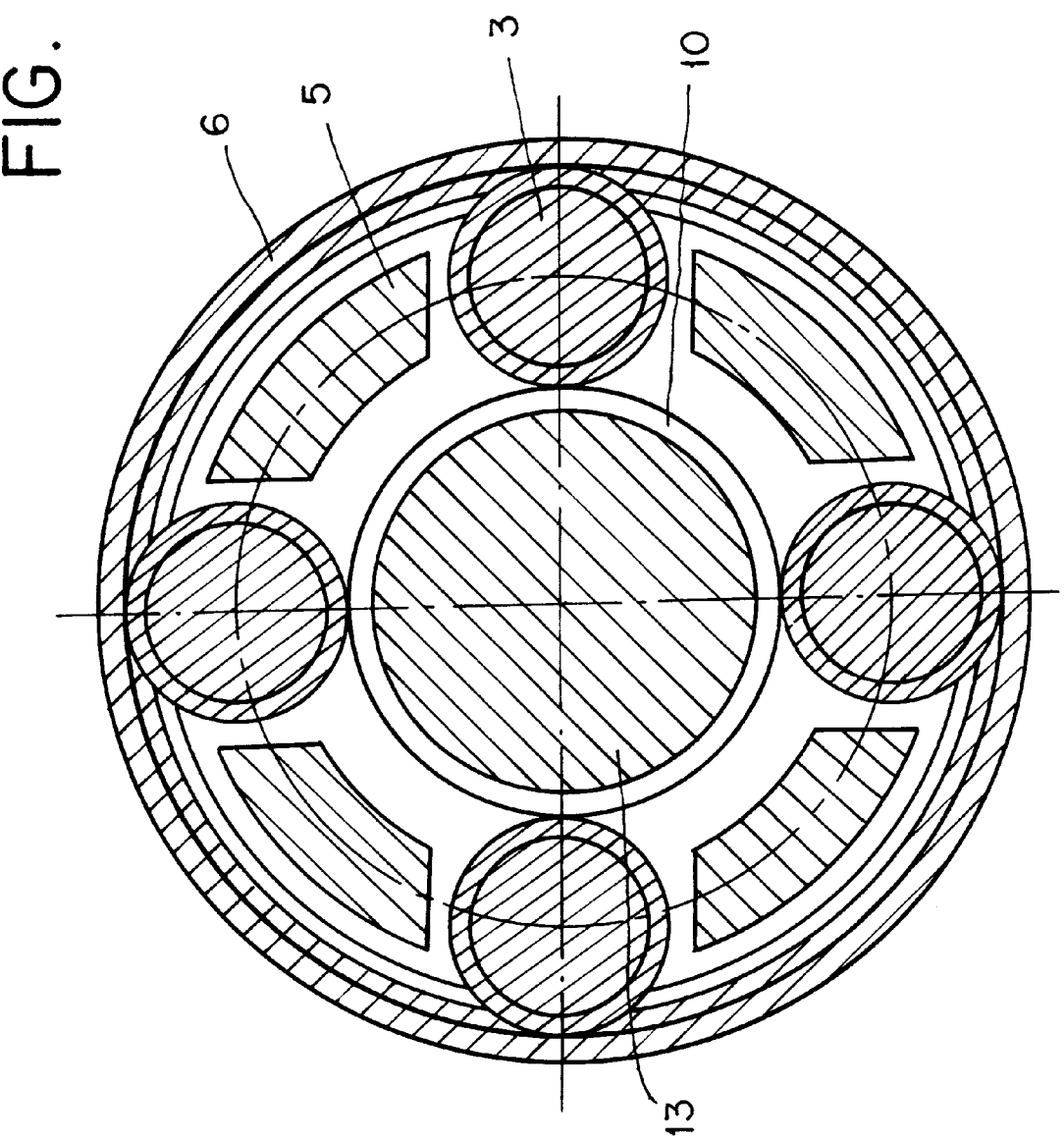
FIG. 2 is a latitudinal cross sectional view of the first embodiment of the invention taken along the line II—II.

Referring to FIG. 1 there is shown a cylindrical drive shaft 1 that is driven by an electric motor (not shown) but accommodated in a bearing ring 12 within a drive housing 11. Connected to drive shaft 1 is a drive pinion 2 that drives a total of four planetary rollers 3 which are each provided with a toothing region 4 at their end facing the electric motor drive housing 11. Pinion 2 contacts planetary rollers 3 in this gear tooth region 4. The planetary rollers 3 are supported within rotatable cage 5, where they are fixed unalterable in circumferential direction.

Planetary rollers 3 engage the inside face of thrust element 6 which is designed as a tube. Both planetary rollers 3 and thrust element 6 are provided with circumferential drive grooves 8 and 7 respectively, with both grooves being thread grooves. However, it is sufficient to have only one of these grooves be a thread groove. The pitch of these grooves is determined by the transmission ratio which is between the number of revolutions of the drive shaft and the axial travel of the thrust element. The precise ratio results from the equation given at the beginning for the axial travel of the thrust element 6. The thrust element 6 can execute only axial movement, for which it is appropriately mounted and guided.

Drive grooves 8 on planetary rollers 3 only engage drive grooves 7 on thrust element 6 and therefore do not engage drive shaft 1. Because there is no double engagement of drive grooves 8, this design is relatively free from impingement and therefore presents a working model to use.

Planetary rollers 3 have additional bearing grooves 9, which are designed radially deeper than grooves 7 and 8. Drive shaft 1 connects to bearing element 13 that contains corresponding mating grooves or profiles 10 that fit within bearing grooves 9. Bearing element 13 fixes planetary rollers 3 axially even if rotatable cage 5 is not axially fixed. When drive shaft 1 rotates, thrust element 6 moves in one of the directions indicated by arrow R, and along axis 100 depending on the design of the pitch of grooves 7 and 8 and depending on the rotational direction of drive shaft 1. This design is significant because it separates bearing grooves 9 on planetary rollers 3 from its drive grooves 8. Thus drive grooves 8 on planetary rollers 3 are free from double engagement and thus the device is relatively free from impingement.

Figure 3:
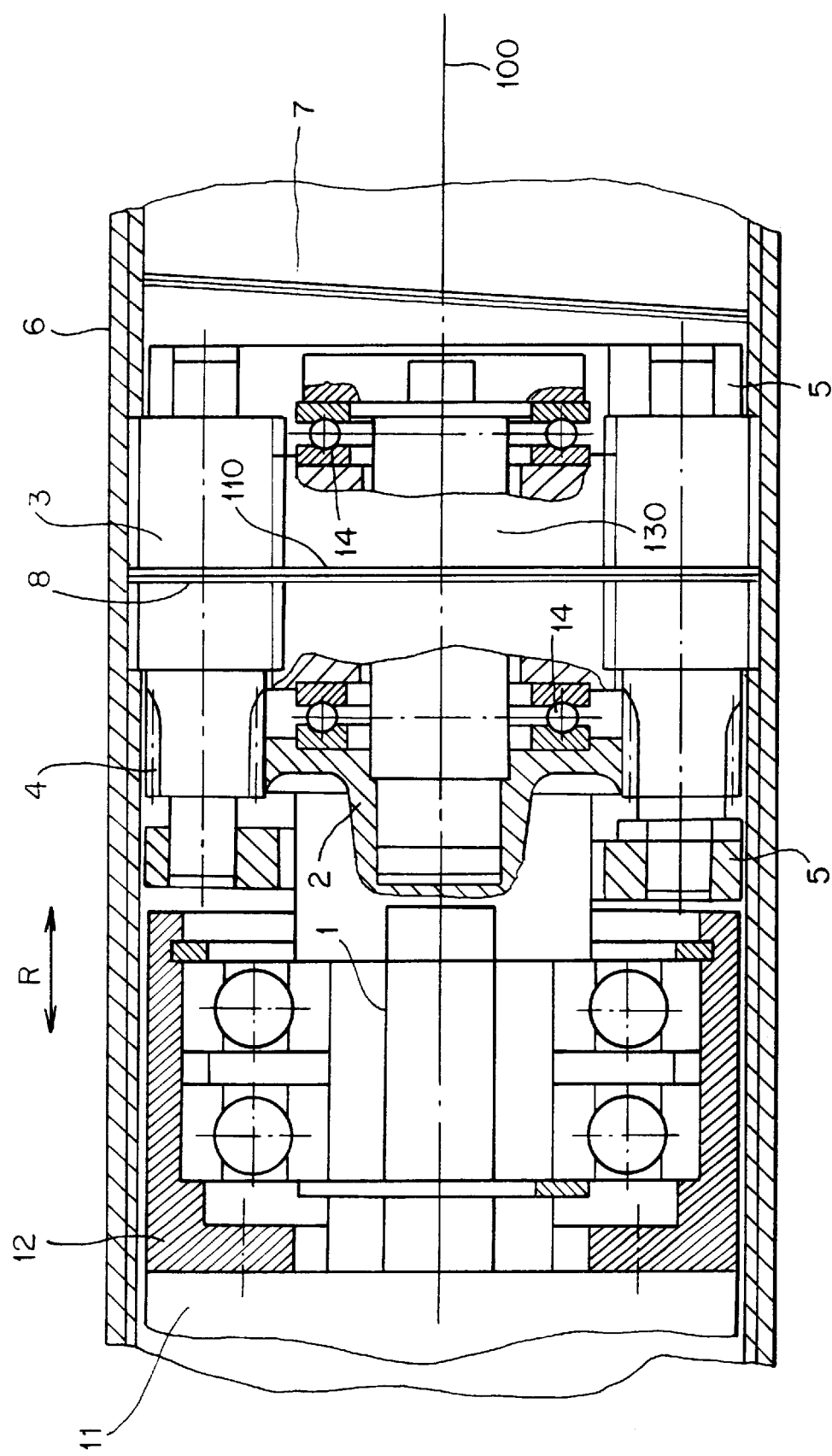
FIG. 3 is a longitudinal cross-sectional view of the second embodiment of the invention.

In the second embodiment, shown in FIG. 3, a bearing element 130 is mounted on drive shaft 1 so that it is axially fixed but freely rotatable. Bearing element 130 rotates on two axial rolling bearings 14, each of which is provided on one of the two ends of bearing element 130. In this way, the rolling circle diameter of drive pinion 2 can be selected in relation to its engagement in the toothing region 4 of the planetary rollers 3, independent of the mean diameter of the bearing grooves 110 of bearing element 130.

The drive grooves 8 of planetary rollers 3, serve simultaneously as bearing grooves. These bearing grooves are zero pitch grooves or thread grooves. If planetary rollers 3 are equipped with thread grooves, then bearing element 130 must also have corresponding thread grooves. If however, planetary rollers 3 have zero-pitch grooves, then bearing element 130 must also have correspondingly shaped grooves. While drive grooves 8, of planetary rollers 3, are in a double engagement between bearing element 130 and thrust element 6, drive grooves 8 in this embodiment have zero pitch which therefore reduces the chances for impingement of the device. Thus, this design is also operable even if drive grooves 8 of planetary rollers 3 are in double engagement.

A concrete example is indicated below, using the equation cited above.

Ua=1 revolution

Ps=1 mm

Pr=0

$d_{gs}$=10 mm $d_{gr}$=$d_{wr}$=3 mm $d_{wa}$=4 mm

Using the values above, the result for 1 revolution of the drive shaft is an axial displacement travel of thrust element 6 of $S_{ax}$=0.286 mm.

The drive pinion 2 can be driven via a coupling in a universally jointed manner, so that a pivoting angle can be realized between the drive axis and the axis of the thrust element 6.

Accordingly, while only two embodiments of the present invention have been shown and described, it is to be understood that many changes and modifications may be made thereunto without departing from the spirit and scope of the invention as defined in the appended claims.

What is claimed is:

1. A device for converting rotary motion into axial motion comprising:

a hollow cylindrically shaped stationary drive housing having a central axis;

a rotatable cage for rotation around the central axis;

a cylindrical drive shaft disposed within said housing along the central axis and within said rotatable cage;

a drive pinion disposed on an end of said drive shaft and having gear teeth;

a plurality of planetary rollers mounted in said rotatable cage, said rollers spaced equidistant around said circumference of said drive shaft;

a series of drive grooves formed on said planetary rollers, said drive grooves having no contact with said drive shaft;

a gear tooth region having teeth located on one end of each of said plurality of planetary rollers said tooth region for meshing with the gear teeth of said drive pinion; and a thrust element slidably disposed outside said drive housing and having at least one internal drive groove for engaging the drive grooves of said rollers, wherein when said drive shaft rotates, it drives said plurality of planetary rollers in a rotary motion causing the grooves on said planetary rollers to engage the drive grooves on said thrust element causing said thrust element to move axially along said central axis; and a first set of bearing grooves arranged around said drive shaft, and corresponding mating bearing grooves disposed on said rollers for axially fixing said planetary rollers around said drive shaft.

2. The device as claimed in claim 1, wherein said first set of bearing grooves are provided on said drive shaft.

3. A device for converting rotary motion into axial motion comprising:

- a hollow cylindrically shaped stationary drive housing having a central axis;
- a cylindrical drive shaft disposed within said housing along the central axis;
- a rotatable cage disposed around said drive shaft for rotation around the central axis;
- a drive pinion disposed on an end of said drive shaft and having gear teeth;
- a plurality of planetary rollers mounted in said rotatable cage, said rollers spaced equidistant around said circumference of said drive shaft;
- a series of drive grooves formed on said planetary rollers, said drive grooves having no contact with said drive shaft;
- a gear tooth region having teeth located on each of said plurality of planetary rollers said tooth region for meshing with the gear teeth of said drive pinion;
- an axially non-displaceable bearing element having mating bearing grooves, said bearing element rotatably supported independently of the drive shaft wherein the mating bearing grooves on said bearing element engage the drive grooves of the planetary rollers; and
- a thrust element slidably disposed outside said drive housing and having at least one internal drive groove for engaging the drive grooves of said rollers, wherein said drive shaft rotates, it drives said plurality of planetary rollers in a rotary motion causing the grooves on said planetary rollers to engage the drive grooves on said thrust element, causing said thrust element to move axially along said central axis.

4. The device as claimed in claim 3, wherein said bearing element is mounted on said drive shaft in an axially fixed and rotatable manner.

5. The device as claimed in claim 3, wherein said bearing grooves have zero pitch and said grooves on said thrust element have a pitch.

* * * * *